(12) United States Patent
Hu et al.

(10) Patent No.: US 11,764,876 B2
(45) Date of Patent: Sep. 19, 2023

(54) OPTICAL FREQUENCY TRANSFER DEVICE BASED ON PASSIVE PHASE COMPENSATION AND TRANSFER METHOD

(71) Applicant: Shanghai Jiao Tong University, Shanghai (CN)

(72) Inventors: Liang Hu, Shanghai (CN); Guiling Wu, Shanghai (CN); Jianping Chen, Shanghai (CN)

(73) Assignee: Shanghai Jiao Tong University, Shanghai (CN)

( * ) Notice: Subject to any disclaimer, the term of this patent is extended or adjusted under 35 U.S.C. 154(b) by 0 days.

(21) Appl. No.: 17/733,972

(22) Filed: Apr. 29, 2022

(65) Prior Publication Data
US 2022/0263584 A1    Aug. 18, 2022

Related U.S. Application Data

(63) Continuation of application No. PCT/CN2020/087394, filed on Apr. 28, 2020.

(30) Foreign Application Priority Data

Dec. 17, 2019    (CN) .......................... 201911298790.5
Dec. 18, 2019    (CN) .......................... 201911306753.4

(51) Int. Cl.
*H04B 10/50* (2013.01)
*H04B 10/58* (2013.01)
(Continued)

(52) U.S. Cl.
CPC .............. *H04B 10/58* (2013.01); *H04B 10/11* (2013.01); *H04B 10/25* (2013.01);
(Continued)

(58) Field of Classification Search
CPC ........ H04B 10/58; H04B 10/11; H04B 10/25; H04B 10/2507; H04B 10/2575;
(Continued)

(56) References Cited

U.S. PATENT DOCUMENTS 5,031,234 A * 7/1991 Primas ............... H04B 10/2587
  398/154
6,185,117 B1    2/2001 Courier De Mere
(Continued)

FOREIGN PATENT DOCUMENTS

CN    108282227 A    7/2018
CN    110429978 A    11/2019

OTHER PUBLICATIONS

Koke et al, (Combining fiber Brillouin amplification with a repeater laser station), Dec. 2019, New Journal of Physics, All Document. (Year: 2019).*

(Continued)

*Primary Examiner* — Dibson J Sanchez
(74) *Attorney, Agent, or Firm* — MEI & MARK LLP; Manni Li

(57) ABSTRACT

An optical frequency transfer device based on passive phase compensation and a transfer method are provided, where the device comprises a local side, a transfer link and a user side. Optical frequency transfer based on passive phase compensation is achieved by simple optical frequency mixing, microwave filtration, and frequency division processing in a passive phase compensation manner, and the device has simple system structure and high reliability.

5 Claims, 2 Drawing Sheets

(51) Int. Cl.
*H04B 10/2575* (2013.01)
*H04B 10/25* (2013.01)
*H04B 10/11* (2013.01)
*H04B 10/2507* (2013.01)
*H04B 10/548* (2013.01)
*H04B 10/60* (2013.01)
*H04B 10/69* (2013.01)

(52) U.S. Cl.
CPC ...... *H04B 10/2507* (2013.01); *H04B 10/2575* (2013.01); *H04B 10/25759* (2013.01); *H04B 10/50* (2013.01); *H04B 10/548* (2013.01); *H04B 10/60* (2013.01); *H04B 10/697* (2013.01)

(58) Field of Classification Search
CPC .............. H04B 10/25759; H04B 10/50; H04B 10/548; H04B 10/60; H04B 10/697
USPC ................. 398/115–117, 140–172, 182–214
See application file for complete search history.

(56) References Cited

U.S. PATENT DOCUMENTS

| | | | | |
|---|---|---|---|---|
| 8,982,917 | B2* | 3/2015 | Uno | H01S 3/136 372/29.011 |
| 10,523,214 | B1* | 12/2019 | Li | H01S 3/094096 |
| 10,826,265 | B2* | 11/2020 | Kim | H04J 14/0202 |
| 2003/0112836 | A1* | 6/2003 | Kim | H04J 14/02 372/18 |
| 2011/0076027 | A1* | 3/2011 | Kiuchi | H04B 10/2575 398/141 |
| 2011/0235661 | A1* | 9/2011 | Grebing | H01S 3/10053 372/23 |
| 2011/0310919 | A1* | 12/2011 | Kefelian | H01S 3/139 372/38.02 |
| 2014/0044434 | A1* | 2/2014 | Hashimoto | H04B 10/118 398/125 |
| 2015/0214693 | A1* | 7/2015 | Hong | H01S 3/13 385/1 |
| 2016/0334652 | A1* | 11/2016 | Sakuma | G02F 1/3534 |
| 2018/0041001 | A1* | 2/2018 | De Vries | H01S 3/1307 |
| 2018/0173027 | A1* | 6/2018 | Morse | G02F 1/113 |
| 2019/0278155 | A1* | 9/2019 | Plascak | G02F 1/353 |
| 2021/0099230 | A1* | 4/2021 | Nishioka | H04B 10/2575 |

OTHER PUBLICATIONS

Deng et al, (Coherent phase transfer via fiber using heterodyne optical phase locking), Nov. 2018, Applied Optics, All Document. (Year: 2018).*
Hucl et al, (Optical frequency transfers between ISI CAS and CESNET), Dec. 2018, SPIE, All Document. (Year: 2018).*
Clivati etal, (Optical frequency transfer over submarine fiber links), Aug. 2018, Opitca, All Document. (Year: 2018).*
Liu et al, (Optical frequency transfer over 400-km commercial fiber network), 2018, ACP, All Document. (Year: 2018).*
Gozzard et al, (Stabilized Free-Space Optical Frequency Transfer), Apr. 2018, America Physical Society, All Document. (Year: 2018).*
Lopez et al, (Ultra-Stable Optical Frequency and Accurate Timing Signal Dissemination), Sep. 2016, ECOC, All Document. (Year: 2016).*
Calosso et al, (Doppler-stabilized fiber link with 6 dB noise improvement), Jan. 2015, Optics Letters, All Document. (Year: 2015).*
Bercy et al, (In-line extraction of an ultra-stable frequency signal over an optical fiber link), Feb. 2014, Journal of the Optical Society of America, All Document. (Year: 2014).*
Stefani et al, (Tackling the Limits of Optical Fiber Links), Dec. 2014, Journal of the Optical Society of America, All Document. (Year: 2014).*
Liu et al, (Experimental study on optical frequency transfer via communication fibers), May 2014, IEE FCS, All Document. (Year: 2014).*
Lopez et al, (Ultra-stable long distance optical frequency distribution), Oct. 2012, Optics Express, All Document. (Year: 2012).*
Chen, Ruihao et al., "Optical phase compensation system design for frequency transferover optical fiber," Optical Communication Technology, pp. 1-4 (Apr. 30, 2014).
Lin, Tiancheng et al., "Passive phase noise compensation for fiber-optic radio frequency transfer with a nonsynchronized source," Chinese Optics Letters, 100602, pp. 1-4 (Oct. 10, 2018).

* cited by examiner

OPTICAL FREQUENCY TRANSFER DEVICE BASED ON PASSIVE PHASE COMPENSATION AND TRANSFER METHOD

CROSS-REFERENCE TO RELATED APPLICATIONS

The subject application is a continuation of PCT/CN2020/087394 filed on Apr. 28, 2020, which claims priority on Chinese Application Nos. 201911298790.5 filed on Dec. 17, 2019 and 201911306753.4 filed on Dec. 18, 2019 in China. The contents and subject matter of the PCT international application and Chinese priority applications are incorporated herein by reference.

TECHNICAL FIELD

The present invention relates to time and frequency transfer in an optical fiber, in particular, an optical frequency transfer device based on passive phase compensation and the transfer method thereof.

BACKGROUND ART

Time is the most precisely measurable unit among the seven international basic units, and precise time frequency plays a vital role in advanced scientific research such as deep space exploration, radio astronomy, basic physical research, geophysical survey, navigational positioning, precision measurement, geodetic survey, and observation as well as major infrastructure and projects. The fast developing optical frequency standard technology has become a powerful candidate for the next-generation time frequency standard. The current space-based time frequency synchronization system is based on satellites which may only achieve nanosecond-level time synchronization precision and stability of transmission at a frequency 1E-15/d. In order to overcome technical difficulties in time frequency transfer of the satellites, an optical frequency transfer technology based on an optical fiber or free space link has been widely demonstrated to be an effective solution for breaking through restrictions from the current technology and achieving long-distance transfer. The optical fiber has the advantages such as low loss, high reliability, large bandwidth, no electromagnetic interference, and little external disturbance. Therefore, optical frequency transfer based on the optical fiber or free space link has been paid more concern and attention internationally. Relevant research has been developed worldwide including U.S.A., European Union, and Japan.

At present, optical frequency transfer is mainly based on automatic phase compensation to compensate phase noise introduced by a transfer link, and no optical transfer solutions based on passive phase compensation have been reported. For active phase noise, a servo control unit is required, which increases the complexity of a system and lower the reliability of the system.

SUMMARY OF THE INVENTION

The present invention provides an optical frequency transfer device based on passive phase compensation and a transfer method thereof to overcome defects in the current technology. According to the present invention, optical frequency transfer based on passive phase compensation is achieved by simple optical frequency mixing, microwave filtering, and frequency division processing, and the device has simple system structure and high reliability.

The technical solutions of the present invention are described as follows:

The present invention provides an optical frequency transfer device based on passive phase compensation, comprising a local side (1), a transfer link (2), and a user side (3); wherein the local side (1) comprises an optical isolator unit (10), a first optical coupler (11), a first Faraday rotator mirror (12), a first acousto-optical frequency shifter (13), an photoelectric conversion unit (14), a frequency mixer unit (15), a first microwave source (16), a frequency divider unit (17), a second microwave source (18), and a first microwave power divider (19); the input end of the optical isolator unit (10) is an input end of a to-be-transferred optical frequency signal, the output end of the optical isolator unit (10) is connected with a port 1 of the first optical coupler (11), ports 2, 3 and 4 of the first optical coupler (11) are respectively connected with the input end of the photoelectric conversion unit (14), a port 1 of the first acousto-optical frequency shifter (13) and the first Faraday rotator mirror (12), a port 3 of the first acousto-optical frequency shifter (13) is connected with one end of the transfer link (2), the output end of the photoelectric conversion unit (14) is connected with a first input port of the frequency mixer unit (15), a second input port of the frequency mixer unit (15) is connected with the output end of the first microwave source (16), a second output port of the frequency mixer unit (15) is connected with the input end of the frequency divider unit (17), the output end of the frequency divider unit (17) is connected with a first input end of the first microwave power divider (19), the output end of the second microwave source (18) is connected with a second input end of the first microwave power divider (19), and the output end of the first microwave power divider (19) is connected with an end where a port 2 of the first acousto-optical frequency shifter (13) is located; the user side (3) comprises a second acousto-optical frequency shifter (20), a third microwave source (21), a second Faraday rotator mirror (22), a second optical coupler (23) and an optical filter (24); and a port 1 of the second acousto-optical frequency shifter (20) is connected with the other end of the transfer link (2), a port 3 of the second acousto-optical frequency shifter (20) is connected with a port 1 of the second optical coupler (23), ports 2 and 3 of the second optical coupler (23) are respectively connected with the optical filter (24) and the second Faraday rotator mirror (22), and the output end of the third microwave source (21) is connected with a port 2 of the second acousto-optical frequency shifter (20).

The present invention discloses a multiple-access optical frequency transfer device based on passive phase compensation, comprising a local side, a transfer link, a user side and an access side, wherein the access side consists of a third optical coupler, a second photoelectric conversion unit, a second frequency divider unit, a third acousto-optical frequency shifter, a second optical filter, a fourth optical coupler, and a fifth optical coupler. Four ports of the third optical coupler are respectively connected with the transfer link, the input end of the fourth optical coupler and the input end of the fifth optical coupler, the output end of the fourth optical coupler is respectively connected with the input end of the third acousto-optical frequency shifter and a port 2 of the fifth optical coupler, a port 3 of the fifth optical coupler is connected with the input end of the second photoelectric conversion unit, the output end of the third acousto-optical frequency shifter is connected with the input end of the second optical filter, the output end of the second photoelectric conversion unit is connected with the input end of the second frequency divider unit, and the output end of the second frequency divider unit is connected with a microwave input port of the third acousto-optical frequency shifter.

In the present invention, the transfer link comprises an optical fiber link or free space link, and the free space link comprises a free space light emission module, a receiving module, and a free space link body.

The present invention further provides an optical frequency transfer method where the optical frequency transfer device based on passive phase compensation of the present invention is utilized, comprising the following steps:

(1) dividing a to-be-transferred optical frequency signal $E_0$ into two parts after passing through the optical isolator unit and the first optical coupler, wherein a part of optical frequency signal $E_0$ serving as local reference light is input to the photoelectric conversion unit after being reflected by the first Faraday rotator mirror and passing through the first optical coupler, the other part of optical frequency signal $E_0$ enters the transfer link after passing through the first acousto-optical frequency shifter, the first acousto-optical frequency shifter works in a frequency downshift mode, a frequency of loading a microwave signal output by the second microwave source to a microwave signal of the first acousto-optical frequency shifter is $\Omega_L$, an output acquired after the optical frequency signal $E_0$ received by the user side is subjected to frequency upshift on the second acousto-optical frequency shifter is $E_1$:

$$E_1 \propto \cos[(\omega_0 - \Omega_L + \Omega_R)t + \phi_p],$$

in Formula (1), $\omega_0$, $\Omega_R$ and $\phi_p$ are respectively an angular frequency of the input optical frequency signal $E_0$, an angular frequency of a working signal of the second acousto-optical frequency shifter and phase noise introduced by the transfer link. Here the initial phases of the input optical frequency signal $E_0$ and output signals of the second microwave source and the third microwave source are neglected herein;

(2) dividing the output of the second acousto-optical frequency shifter into two paths by the second optical coupler, wherein a part of optical frequency signal output from the port 2 of the second optical coupler is used by a user; and the other part of optical frequency signal $E_1$ output from the port 3 of the second optical coupler returns to the local side after being reflected by the second Faraday rotator mirror and sequentially passing through the ports 3 and 1 of the second optical coupler, the ports 3 and 1 of the second acousto-optical frequency shifter and the transfer link, and the signal returned to the local side is input to the photoelectric conversion unit after passing through the ports 3 and 1 of the first acousto-optical frequency shifter and the ports 3 and 2 of the first optical coupler, is subjected to frequency beat on the photoelectric conversion unit together with the optical frequency signal $E_0$ of the reference light on the local side, and is then filtered by a narrow-band bandpass filter to acquire a lower sideband signal $E_3$:

$$E_3 \propto \cos[(\Omega_R - \Omega_L)t + 2\phi_p],$$

in Formula (2), the phase noises introduced by the transfer link during both forward transmission and backward transmission are both equal to $\phi_p$;

(3) outputting a signal with an angular frequency $\Omega_s$ after $E_3$ passes through the frequency mixer unit and the first microwave source, performing frequency mixing, and then, acquiring an upper sideband signal $E_4$:

$$E_4 \propto \cos[(\Omega_S + \Omega_R - \Omega_L)t + 2\phi_p];$$

(4) after $E_4$ passes through the frequency divider unit (15), acquiring an output signal $E_5$:

$$E_5 \propto \cos[(\Omega_S + \Omega_R - \Omega_L)t/2 + \phi_p];$$

(5) loading $E_5$ and the microwave signal output by the second microwave source (18) to the port 2 of the first acousto-optical frequency shifter (13) at the same time after combination by the first microwave power divider (19);

(6) retransmitting, by the local side (1), an optical frequency signal $E_7$ output by the ports 1 and 3 of the second acousto-optical frequency shifter (20) and the ports 1 and 2 of the second optical coupler (21) to the user side:

$$E_7 \propto \cos[(\omega_0 - \Omega_L + \Omega_R)t + \phi_p] + \cos[(\omega_0 - (\Omega_S + \Omega_R - \Omega_L)/2)t];$$

and (7) filtering a second-term optical frequency signal in $E_7$ through the optical filter (22), we can have:

$$E_8 \propto \cos[(\omega_0 - (\Omega_S + \Omega_R - \Omega_L)/2)t].$$

The optical frequency transfer method of the present invention where the above-mentioned multiple-access optical frequency transfer device based on passive phase compensation is utilized, wherein the method includes the following steps:

(1) dividing a to-be-transferred optical frequency signal $E_0$ into two parts after passing through the optical isolator unit and the first optical coupler, wherein a part of optical frequency signal $E_0$ serving as local reference light is input to the photoelectric conversion unit after being reflected by the first Faraday rotator mirror and passing through the first optical coupler, the other part of optical frequency signal $E_0$ enters the transfer link after passing through the first acousto-optical frequency shifter, the first acousto-optical frequency shifter works in a frequency downshift mode, a frequency of loading a microwave signal output by the second microwave source to a microwave signal of the first acousto-optical frequency shifter is $\Omega_L$, an output acquired after the optical frequency signal $E_0$ received by the user side is subjected to frequency upshift on the second acousto-optical frequency shifter is $E_1$:

$$E_1 \propto \cos[(\omega_0 - \Omega_L + \Omega_R)t + \phi_p],$$

in the formula, $\omega_0$, $\Omega R$ and $\phi_p$ are respectively an angular frequency of the input optical frequency signal $E_0$, an angular frequency of a working signal of the second acousto-optical frequency shifter and phase noise introduced by the transfer link, and initial phases of the input optical frequency signal $E_0$ and output signals of the second microwave source and the third microwave source are neglected herein; dividing the output of the second acousto-optical frequency shifter into two paths by the second optical coupler, wherein a part of optical frequency signal output from the port 2 of the second optical coupler is used by a user; and the other part of optical frequency signal $E_1$ output from the port 3 of the second optical coupler returns to the local side after being reflected by the second Faraday rotator mirror and sequentially passing through the ports 3 and 1 of the second optical coupler, the ports 3 and 1 of the second acousto-optical frequency shifter and the transfer link, and the signal returned to the local side is input to the photoelectric conversion unit after passing through the ports 3 and 1 of the first acousto-optical frequency shifter and the ports 3 and 2 of the first optical coupler, is subjected to frequency beat on the photoelectric conversion unit together with the optical frequency signal $E_0$ of the reference light on the local side, and is then filtered by a narrow-band bandpass filter to acquire a lower sideband signal $E_3$:

$$E_3 \propto \cos[(\Omega_R - \Omega_L)t + 2\phi_p],$$

in the formula, phase noise introduced by the transfer link during both forward transmission and backward transmission is $\phi_p$:

outputting, by $E_3$, an angular frequency $\Omega_s$ through the frequency mixer unit (15) and the first microwave source (16), and after performing frequency mixing on the signal, acquiring an upper sideband signal $E_4$:

$$E_4 \propto \cos[(\Omega_S + \Omega_R - \Omega_L)t + 2\phi_p];$$

after $E_4$ passes through the frequency divider unit, acquiring an output signal $E_5$:

$$E_5 \propto \cos[(\Omega_S + \Omega_R - \Omega_L)t/2 + \phi_p];$$

loading $E_5$ and the microwave signal output by the second microwave source to the port 2 of the first acousto-optical frequency shifter at the same time after beam combination by the first microwave power divider;

retransmitting, by the local side, an optical frequency signal output by the ports 1 and 3 of the second acousto-optical frequency shifter and the ports 1 and 2 of the second optical coupler to the user side, and filtering a second-term optical frequency signal $E_7$ in $E_7$ through the optical filter:

$$E_7 \propto \cos[(\omega_0 - (\Omega_S + \Omega_R - \Omega_L)/2)t];$$

and (2) acquiring a forward light signal $E_8$ and a backward light signal $E_9$ in the transfer link from any node of the transfer link by adopting the third optical coupler:

$$E_8 \propto \cos[(\omega_0 - \Omega_L + 2\Omega_R)t + \phi_p + \phi_b] + \cos[(\omega_0 + \Omega_L + \Omega_R)t + \phi_b]$$

$$E_9 \propto \cos[(\omega_0 - \Omega_L)t + \phi_a] + \cos[(\omega_0 + \Omega_L)t - \phi_p + \phi_a],$$

wherein in the formulae, $\phi_a$ is phase noise introduced by the transfer link from the local side to an access side, and $\phi_b$ is phase noise introduced by the transfer link between the user side to the access side; after inputting $E_8$ and $E_9$ to the second photoelectric conversion unit through the fifth optical coupler and performing frequency beat, acquiring $E_{10}$:

$$E_{10} \propto \cos[(\Omega_R t + \phi_p] + \cos[\Omega_R t + \phi_b - \phi_a] \cos[(3\Omega_R - 2\Omega_L)t + \phi_b - \phi_a] +$$
$$\cos[2(\Omega_R - \Omega_L)t + \phi_p + \phi_b - \phi_a] +$$
$$\cos[(2\Omega_L - \Omega_R)t - \phi_p] \cos[2\Omega_R t + \phi_p + \phi_b - \phi_a];$$

after narrow-band filtration of a final term of $E_{10}$ and two frequency division of the second frequency divider unit, acquiring $E_{11}$ according to a phase relation $\phi_p = \phi_a + \phi_b$:

$$E_{11} \propto \cos[\Omega_R t + \phi_b];$$

after loading $E_{11}$ on the third acousto-optical frequency shifter (28), reversely transferring a signal $E_{12}$:

$$E_{12} \propto \cos[(\omega_0 - \Omega_L + \Omega_R)t + \phi_p] + \cos[(\omega_0 + \Omega_L)t;$$

and filtering a second term of $E_{12}$ in the formula by the second optical filter (29) to acquire a phase-stabilized optical frequency signal $E_{13} = \cos[(\omega_0 + \Omega_L)t$ to be output.

The working principle of the present invention is that the local side transmits the optical frequency signal to the user side through the transfer link, the user side returns the optical frequency signal to the local side through the second acousto-optical frequency shifter and the second Faraday rotator mirror, the returned optical frequency signal and a locally input optical frequency are subjected to frequency mixing on the photoelectric conversion unit, and then, the lower sideband signal is filtered to acquire the phase noise introduced by the transfer link; and the filtered lower sideband signal is subjected to 3/2 frequency multiplication, the frequency-multiplied signal drives the first acousto-optical frequency shifter working in the frequency downshift mode to generate an optical frequency signal in phase conjugate with the phase noise introduced by the transfer link, the signal is transmitted to the user side by the transfer link, then, a phase-stabilized optical frequency signal may be acquired, and thus, the phase-stabilized transfer of an optical frequency is achieved.

On the other hand, forward and backward optical signals are acquired on any position of the transfer link by the optical couple and are subjected to frequency mixing on the photoelectric conversion unit, the corresponding microwave signal is extracted by adopting a narrow-band filter and is subjected to two frequency division, the frequency-divided microwave signal is loaded to an acousto-optical modulator for regulating a frequency of returning to the optical signal, the output end of the acousto-optical modulator passes through the optical filter, then, a phase-stabilized frequency signal may be acquired, and thus, multiple-access optical frequency transfer is achieved.

The present invention has the following technical effects:

(1) optical frequency transfer based on passive phase compensation is achieved by simple optical frequency mixing, microwave filtration and frequency division processing in a passive phase compensation manner;

(2) the phase-stabilized optical frequency signal is acquired on any position of the transfer link by using a method comprising the steps of extracting the forward and backward signals from the transfer link by adopting the optical coupler, performing frequency beat on the photoelectric conversion unit, then, filtering the signal by a narrow-band microwave filter, and performing real-time compensation by using the acousto-optical modulator; and (3) the device has the characteristics of simple structure, high reliability and low implementation cost.

DETAILED DESCRIPTION OF THE INVENTION

The present invention is further described below in conjunction with embodiments and the accompanying drawings. The embodiments are implemented on the premise of technical solutions of the present invention, detailed implementation manners and specific working processes are given, however, the protection scope of the present invention is not limited to the following embodiments.

Figure 1:
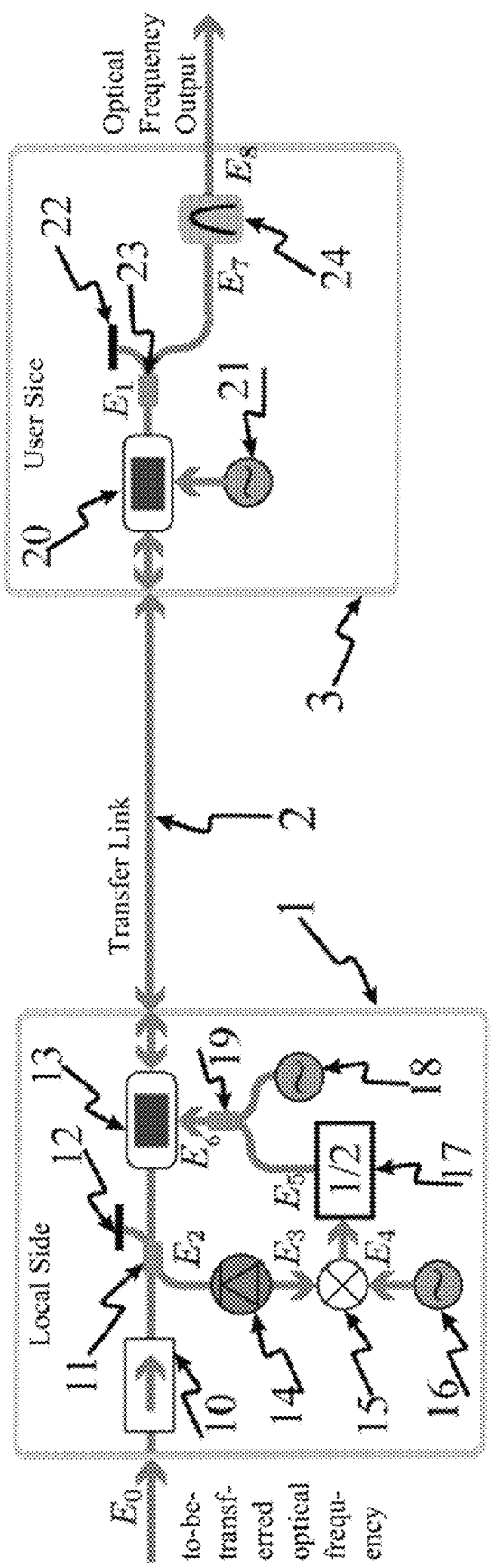
FIG. 1 shows the structure of one embodiment of the optical frequency transfer device based on passive phase compensation in the present invention.

As shown in FIG. 1, the structure of one embodiment of the optical frequency transfer device based on passive phase compensation in the present invention comprises a local side 1, a transfer link 2, and a user side 3. The local side 1 comprises an optical isolator unit 10, a first optical coupler 11, a first Faraday rotator mirror 12, a first acousto-optical frequency shifter 13, an photoelectric conversion unit 14, a frequency mixer unit 15, a first microwave source 16, a frequency divider unit 17, a second microwave source 18, and a first microwave power divider 19, wherein the input end of the optical isolator unit 10 is an input end of a to-be-transferred optical frequency signal, the output end of the optical isolator unit 10 is connected with a port 1 of the first optical coupler 11, ports 2, 3, and 4 of the first optical coupler 11 are respectively connected with the input end of the photoelectric conversion unit 14, a port 1 of the first acousto-optical frequency shifter 13 and the first Faraday rotator mirror 12, a port 3 of the first acousto-optical frequency shifter 13 is connected with one end of the transfer link 2, the output end of the photoelectric conversion unit 14 is connected with a first input port of the frequency mixer unit 15, a second input port of the frequency mixer unit 15 is connected with the output end of the first microwave source 16, a second output port of the frequency mixer unit 15 is connected with the input end of the frequency divider unit 17, the output end of the frequency divider unit 17 is connected with a first input end of the first microwave power divider 19, the output end of the second microwave source 18 is connected with a second input end of the first microwave power divider 19, and the output end of the first microwave power divider 19 is connected with an end where a port 2 of the first acousto-optical frequency shifter 13 is located; and the user side 3 consists of a second acousto-optical frequency shifter 20, a third microwave source 21, a second Faraday rotator mirror 22, a second optical coupler 23 and an optical filter 24, wherein a port 1 of the second acousto-optical frequency shifter 20 is connected with the other end of the transfer link 2, a port 3 of the second acousto-optical frequency shifter 20 is connected with a port 1 of the second optical coupler 23, ports 2 and 3 of the second optical coupler 23 are respectively connected with the optical filter 24 and the second Faraday rotator mirror 22, and the output end of the third microwave source 21 is connected with a port 2 of the second acousto-optical frequency shifter 20.

In the embodiment, the transfer link 2 consists of an optical fiber link, the local side 1 is located on one end of the transfer link 2, and the user side 3 is located on the other end of the transfer link 2.

The optical frequency transfer method where the optical frequency transfer device based on passive phase compensation of the present invention is used comprises the following steps:

a to-be-transferred optical frequency signal E0 is divided into two parts after passing through the optical isolator unit 10 and the first optical coupler 11, wherein a part of optical frequency signal $E_0$ serving as local reference light is input to the photoelectric conversion unit 14 after being reflected by the first Faraday rotator mirror 12 and passing through the first optical coupler 11, the other part of optical frequency signal $E_0$ enters the transfer link 2 after passing through the first acousto-optical frequency shifter 13, the first acousto-optical frequency shifter 13 works in a frequency downshift mode, a frequency of loading a microwave signal output by the second microwave source 18 to a microwave signal of the first acousto-optical frequency shifter 13 is $\Omega_L$, an output acquired after the optical frequency signal $E_0$ received by the user side 3 is subjected to frequency upshift on the second acousto-optical frequency shifter 20 is $E_1$:

$$E_1 \propto \cos[(\omega_0 - \Omega_L + \Omega_R)t + \phi_p],$$

in the formula (1), $\Omega_0$, $\Omega R$ and $\phi_p$ are respectively an angular frequency of the input optical frequency signal $E_0$, an angular frequency of a working signal of the second acousto-optical frequency shifter 20 and phase noise introduced by the transfer link 2, and initial phases of the input optical frequency signal $E_0$ and output signals of the second microwave source 18 and the third microwave source 21 are neglected herein;

the output of the second acousto-optical frequency shifter 20 is divided into two paths by the second optical coupler 23, wherein a part of optical frequency signal output from the port 2 of the second optical coupler 23 is used by a user; and the other part of optical frequency signal $E_1$ output from the port 3 of the second optical coupler 23 returns to the local side 1 after being reflected by the second Faraday rotator mirror 22 and sequentially passing through the ports 3 and 1 of the second optical coupler 23, the ports 3 and 1 of the second acousto-optical frequency shifter 20 and the transfer link 2, and the signal returned to the local side 1 is input to the photoelectric conversion unit 14 after passing through the ports 3 and 1 of the first acousto-optical frequency shifter 13 and the ports 3 and 2 of the first optical coupler 11, is subjected to frequency beat on the photoelectric conversion unit 14 together with the optical frequency signal $E_0$ of the reference light on the local side, and is then filtered by a narrow-band bandpass filter to acquire a lower sideband signal $E_3$:

$$E_3 \propto \cos[(\Omega_R - \Omega_L)t + 2\phi_p],$$

in the formula (2), phase noise introduced by the transfer link 2 during both forward transmission and backward transmission is $\phi_p$;

a signal with an angular frequency $\Omega_s$ is output after $E_3$ passes through the frequency mixer unit 15 and the first microwave source 16, frequency mixing is performed, and then, an upper sideband signal $E_4$ is acquired:

$$E_4 \propto \cos[(\Omega_S + \Omega_R - \Omega_L)t + 2\phi_p];$$

after $E_4$ passes through the frequency divider unit 15, an output signal $E_5$ is acquired:

$$E_5 \propto \cos[(\Omega_S + \Omega_R - \Omega_L)t/2 + \phi_p];$$

E5 and the microwave signal output by the second microwave source 18 are loaded to the port 2 of the first acousto-optical frequency shifter 13 at the same time after beam combination by the first microwave power divider 19;

the local side 1 retransmits an optical frequency signal $E_7$ output by the ports 1 and 3 of the second acousto-optical frequency shifter 20 and the ports 1 and 2 of the second optical coupler 21 to the user side:

$$E_7 \propto \cos[(\omega_0 - \Omega_L + \Omega_R)t + \phi_p] + \cos[(\omega_0 - (\Omega_S + \Omega_R - \Omega_L)/2)t];$$

and a second-term optical frequency signal $E_8$ in $E_7$ is filtered through the optical filter 22:

$$E_8 \propto \cos[(\omega_0 - (\Omega_S + \Omega_R - \Omega_L)/2)t].$$

According to the present invention, the optical frequency transfer based on passive phase compensation is achieved by simple optical frequency mixing, microwave filtration and frequency division processing in a passive phase compensation manner, and the device has the characteristics of simple system structure and high reliability.

Figure 2:
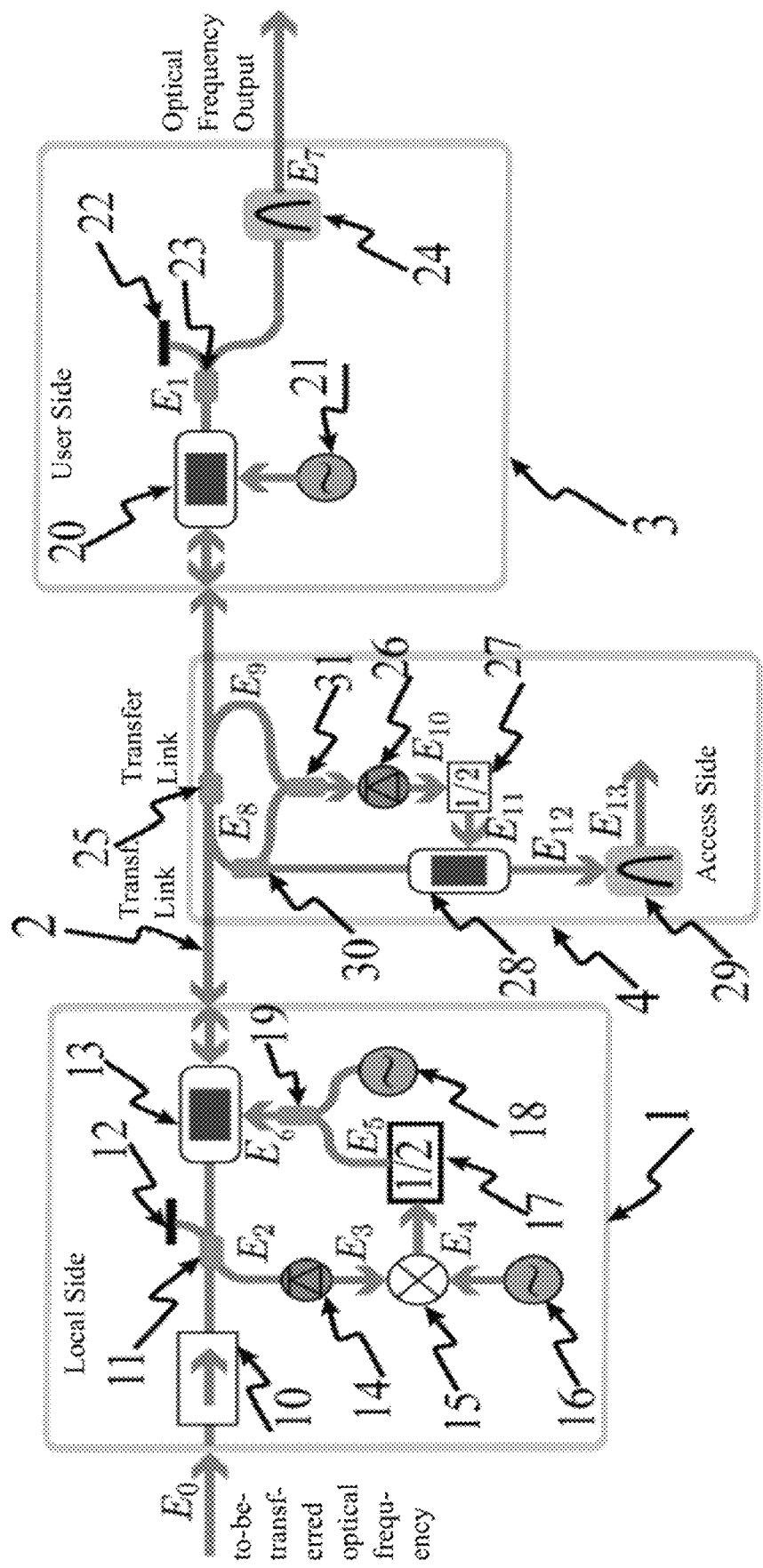
FIG. 2 shows the structure of one embodiment of the multiple-access optical frequency transfer device based on passive phase compensation in the present invention.

As shown in FIG. 2, the structure of one embodiment of a multiple-access optical frequency transfer device based on passive phase compensation in the present invention further comprises an access side 4, wherein the access side 4 consists of a third optical coupler 25, a second photoelectric conversion unit 26, a second frequency divider unit 27, a third acousto-optical frequency shifter 28, a second optical filter 29, a fourth optical coupler 30, and a fifth optical coupler 31. Four ports of the third optical coupler 25 are respectively connected with the transfer link 2, the input end of the fourth optical coupler 30 and the input end of the fifth optical coupler 31, the output end of the fourth optical coupler 30 is respectively connected with the input end of the third acousto-optical frequency shifter 28 and a port 2 of the fifth optical coupler 31, a port 3 of the fifth optical coupler 31 is connected with the input end of the second photoelectric conversion unit 26, the output end of the third acousto-optical frequency shifter 28 is connected with the input end of the second optical filter 29, the output end of the second photoelectric conversion unit 26 is connected with the input end of the second frequency divider unit 27, and the output end of the second frequency divider unit is connected with a microwave input port of the third acousto-optical frequency shifter 28.

The optical frequency transfer method of the present invention where the above-mentioned optical frequency transfer device based on passive phase compensation is utilized further comprises the following steps: a forward light signal $E_8$ and a backward light signal $E_9$ in the transfer link are acquired from any node of the transfer link 2 by adopting the third optical coupler 25:

$$E_8 \propto \cos[(\omega_0 - \Omega_L + 2\Omega_R)t + \phi_p + \phi_b] + \cos[(\omega_0 + \Omega_L + \Omega_R)t + \phi_b]$$

$$E_9 \propto \cos[(\omega_0 - \Omega_L)t + \phi_a] + \cos[(\omega_0 + \Omega_L)t - \phi_p + \phi_a],$$

wherein in the formulae, $\phi_a$ is phase noise introduced by the transfer link from the local side 1 to an access side 4, and $\phi_b$ is phase noise introduced by the transfer link between the user side 3 to the access side 4; after $E_8$ and $E_9$ are input to the second photoelectric conversion unit 26 through the fifth optical coupler 31 and frequency beat is performed, $E_{10}$ is acquired:

$$E_{10} \propto \cos[\Omega_R t + \phi_p] + \cos[\Omega_R t + \phi_b - \phi_a]\cos[(3\Omega_R - 2\Omega_L)t + \phi_b - \phi_a] +$$
$$\cos[2(\Omega_R - \Omega_L)t + \phi_p + \phi_b - \phi_a] +$$
$$\cos[(2\Omega_L - \Omega_R)t - \phi_p]\cos[2\Omega_R t + \phi_p + \phi_b - \phi_a];$$

after narrow-band filtration of a final term of $E_{10}$ and two frequency division of the second frequency divider unit (27), $E_{11}$ may be acquired according to a phase relation $\phi_p = \phi_a + \phi_b$:

$$E_{11} \propto \cos[\Omega_R t + \phi_b];$$

after $E_{11}$ is loaded on the third acousto-optical frequency shifter (28), a signal $E_{12}$ is reversely transferred:

$$E_{12} \propto \cos[(\omega_0 - \Omega_L + \Omega_R)t + \phi_p] + \cos[(\omega_0 + \Omega_L)t];$$

and a second term of $E_{12}$ in the formula is filtered by the second optical filter (29) to acquire a phase-stabilized optical frequency signal $E_{13} = \cos[(\omega 0 + \Omega L)t$ to be output.

We claim:

1. An optical frequency transfer device based on passive phase compensation, comprising
    a local side (1),
    a transfer link (2), and
    a user side (3),
    wherein the local side (1) comprises an optical isolator unit (10), a first optical coupler (11), a first Faraday rotator mirror (12), a first acousto-optical frequency shifter (13), an photoelectric conversion unit (14), a frequency mixer unit (15), a first microwave source (16), a frequency divider unit (17), a second microwave source (18), and a first microwave power divider (19);
    the input end of the optical isolator unit (10) is an input end of a to-be-transferred optical frequency signal, the output end of the optical isolator unit (10) is connected with a port 1 of the first optical coupler (11), ports 2, 3 and 4 of the first optical coupler (11) are respectively connected with the input end of the photoelectric conversion unit (14), a port 1 of the first acousto-optical frequency shifter (13) and the first Faraday rotator mirror (12), a port 3 of the first acousto-optical frequency shifter (13) is connected with one end of the transfer link (2), the output end of the photoelectric conversion unit (14) is connected with a first input port of the frequency mixer unit (15), a second input port of the frequency mixer unit (15) is connected with the output end of the first microwave source (16), a second output port of the frequency mixer unit (15) is connected with the input end of the frequency divider unit (17), the output end of the frequency divider unit (17) is connected with a first input end of the first microwave power divider (19), the output end of the second microwave source (18) is connected with a second input end of the first microwave power divider (19), and the output end of the first microwave power divider (19) is connected with an end where a port 2 of the first acousto-optical frequency shifter (13) is located; and
    the user side (3) comprises a second acousto-optical frequency shifter (20), a third microwave source (21), a second Faraday rotator mirror (22), a second optical coupler (23) and an optical filter (24);
    a port 1 of the second acousto-optical frequency shifter (20) is connected with the other end of the transfer link (2), a port 3 of the second acousto-optical frequency shifter (20) is connected with a port 1 of the second optical coupler (23), ports 2 and 3 of the second optical coupler (23) are respectively connected with the optical filter (24) and the second Faraday rotator mirror (22), and the output end of the third microwave source (21) is connected with a port 2 of the second acousto-optical frequency shifter (20).

2. The optical frequency transfer device based on passive phase compensation of claim 1, further comprising
    an access side (4) comprising a third optical coupler (25), a second photoelectric conversion unit (26), a second frequency divider unit (27), a third acousto-optical frequency shifter (28), a second optical filter (29), a fourth optical coupler (30), and a fifth optical coupler (31),
    wherein four ports of the third optical coupler (25) are respectively connected with the transfer link (2), the input end of the fourth optical coupler (30) and the input end of the fifth optical coupler (31), the output end of the fourth optical coupler (30) is respectively connected with the input end of the third acousto-optical frequency shifter (28) and a port 2 of the fifth optical coupler (31), a port 3 of the fifth optical coupler (31) is connected with the input end of the second photoelectric conversion unit (26), the output end of the third acousto-optical frequency shifter (28) is connected with the input end of the second optical filter (29), the output end of the second photoelectric conversion unit (26) is connected with the input end of the second frequency divider unit (27), and the output end of the second frequency divider unit is connected with a microwave input port of the third acousto-optical frequency shifter (28).

3. The optical frequency transfer device based on passive phase compensation of claim 1, wherein the transfer link (2) comprises an optical fiber link or free space link, and
    the free space link comprises a free space light emission module, a receiving module, and a free space link body.

4. An optical frequency transfer method using the optical frequency transfer device based on passive phase compensation of claim 1, comprising:
    (i) dividing a to-be-transferred optical frequency signal $E_0$ into two parts after passing through the optical isolator unit (10) and the first optical coupler (11), wherein a part of optical frequency signal $E_0$ serving as local reference light is input to the photoelectric conversion unit (14) after being reflected by the first Faraday rotator mirror (12) and passing through the first optical coupler (11), the other part of optical frequency signal $E_0$ enters the transfer link (2) after passing through the first acousto-optical frequency shifter (13), the first acousto-optical frequency shifter (13) works in a frequency downshift mode, a frequency of loading a microwave signal output by the second microwave source (18) to a microwave signal of the first acousto-optical frequency shifter (13) is $\Omega_L$, an output acquired after the optical frequency signal $E_0$ received by the user side (3) is subjected to frequency upshift on the second acousto-optical frequency shifter (20) is $E_1$:

$$E_1 \propto \cos[(\omega_0 - \Omega_L + \Omega_R)t + \phi_p],$$

wherein $\omega_0$, $\Omega R$ and $\phi_p$ are respectively an angular frequency of the input optical frequency signal $E_0$, an angular frequency of a working signal of the second acousto-optical frequency shifter (20) and phase noise introduced by the transfer link (2), and initial phases of the input optical frequency signal $E_0$ and output signals of the second microwave source (18) and the third microwave source (21) are neglected herein;
    (ii) dividing the output of the second acousto-optical frequency shifter (20) into two paths by the second optical coupler (23), wherein a part of optical frequency signal output from the port 2 of the second optical coupler (23) is used by a user; and the other part of optical frequency signal $E_1$ output from the port 3 of the second optical coupler (23) returns to the local side (1) after being reflected by the second Faraday rotator mirror (22) and sequentially passing through the ports 3 and 1 of the second optical coupler (23), the ports 3 and 1 of the second acousto-optical frequency shifter (20) and the transfer link (2), and the signal returned to the local side (1) is input to the photoelectric conversion unit (14) after passing through the ports 3 and 1 of the first acousto-optical frequency shifter (13) and the ports 3 and 2 of the first optical coupler (11), is subjected to frequency beat on the photoelectric conversion unit (14) together with the optical frequency signal $E_0$ of the reference light on the local side, and is then filtered by a narrow-band bandpass filter to acquire a lower sideband signal $E_3$:

$$E_3 \propto \cos[(\Omega_R - \Omega_L)t + 2\phi_p],$$

wherein phase noise introduced by the transfer link (2) during both forward transmission and backward transmission is $\phi_p$:

(iii) outputting a signal with an angular frequency $\Omega_s$ after $E_3$ passes through the frequency mixer unit (15) and the first microwave source (16), performing frequency mixing, and then, acquiring an upper sideband signal $E_4$:

$$E_4 \propto \cos[(\Omega_S + \Omega_R - \Omega_L)t + 2\phi_p];$$

(iv) after $E_4$ passes through the frequency divider unit (15), acquiring an output signal $E_5$:

$$E_5 \propto \cos[(\Omega_S + \Omega_R - \Omega_L)t/2 + \phi_p];$$

(v) loading $E_5$ and the microwave signal output by the second microwave source (18) to the port 2 of the first acousto-optical frequency shifter (13) at the same time after beam combination by the first microwave power divider (19);

(vi) retransmitting, by the local side (1), an optical frequency signal $E_7$ output by the ports 1 and 3 of the second acousto-optical frequency shifter (20) and the ports 1 and 2 of the second optical coupler (21) to the user side:

$$E_7 \propto \cos[(\omega_0 - \Omega_L + \Omega_R)t + \phi_p] + \cos[(\omega_0 - (\Omega_S + \Omega_R - \Omega_L)/2)t];$$

and (vii) filtering a second-term optical frequency signal $E_8$ in $E_7$ through the optical filter (22):

$$E_8 \propto \cos[(\omega_0 - (\Omega_S + \Omega_R - \Omega_L)/2)t].$$

5. An optical frequency transfer method using the optical frequency transfer device based on passive phase compensation of claim 1 comprising:

(i) dividing a to-be-transferred optical frequency signal $E_0$ into two parts after passing through the optical isolator unit (10) and the first optical coupler (11), wherein a part of optical frequency signal $E_0$ serving as local reference light is input to the photoelectric conversion unit (14) after being reflected by the first Faraday rotator mirror (12) and passing through the first optical coupler (11), the other part of optical frequency signal $E_0$ enters the transfer link (2) after passing through the first acousto-optical frequency shifter (13), the first acousto-optical frequency shifter (13) works in a frequency downshift mode, a frequency of loading a microwave signal output by the second microwave source (18) to a microwave signal of the first acousto-optical frequency shifter (13) is $\Omega_L$, an output acquired after the optical frequency signal $E_0$ received by the user side (3) is subjected to frequency upshift on the second acousto-optical frequency shifter (20) is $E_1$:

$$E_1 \propto \cos[(\omega_0 - \Omega_L + \Omega_R)t + \phi_p],$$

wherein $\omega_0$, $\Omega R$ and $\phi_p$ are respectively an angular frequency of the input optical frequency signal $E_0$, an angular frequency of a working signal of the second acousto-optical frequency shifter (20) and phase noise introduced by the transfer link (2), and initial phases of the input optical frequency signal $E_0$ and output signals of the second microwave source (18) and the third microwave source (21) are neglected herein; dividing the output of the second acousto-optical frequency shifter (20) into two paths by the second optical coupler (23), wherein a part of optical frequency signal output from the port 2 of the second optical coupler (23) is used by a user; and the other part of optical frequency signal $E_1$ output from the port 3 of the second optical coupler (23) returns to the local side (1) after being reflected by the second Faraday rotator mirror (22) and sequentially passing through the ports 3 and 1 of the second optical coupler (23), the ports 3 and 1 of the second acousto-optical frequency shifter (20) and the transfer link (2), and the signal returned to the local side (1) is input to the photoelectric conversion unit (14) after passing through the ports 3 and 1 of the first acousto-optical frequency shifter (13) and the ports 3 and 2 of the first optical coupler (11), is subjected to frequency beat on the photoelectric conversion unit (14) together with the optical frequency signal $E_0$ of the reference light on the local side, and is then filtered by a narrow-band bandpass filter to acquire a lower sideband signal $E_3$:

$$E_3 \propto \cos[(\Omega_R - \Omega_L)t + 2\phi_p],$$

wherein phase noise introduced by the transfer link (2) during both forward transmission and backward transmission is $\phi_p$:

outputting, by $E_3$, an angular frequency $\Omega_s$ through the frequency mixer unit (15) and the first microwave source (16), and after performing frequency mixing on the signal, acquiring an upper sideband signal $E_4$:

$$E_4 \propto \cos[(\Omega_S + \Omega_R - \Omega_L)t + 2\phi_p];$$

after $E_4$ passes through the frequency divider unit (15), acquiring an output signal $E_5$:

$$E_5 \propto \cos[(\Omega_S + \Omega_R - \Omega_L)t/2 + \phi_p];$$

loading $E_5$ and the microwave signal output by the second microwave source (18) to the port 2 of the first acousto-optical frequency shifter (13) at the same time after beam combination by the first microwave power divider (19);

retransmitting, by the local side (1), an optical frequency signal output by the ports 1 and 3 of the second acousto-optical frequency shifter (20) and the ports 1 and 2 of the second optical coupler (21) to the user side, and filtering a second-term optical frequency signal $E_7$ in $E_7$ through the optical filter (22):

$$E_7 \propto \cos[(\omega_0 - (\Omega_S + \Omega_R - \Omega_L)/2)t];$$

and (ii) acquiring a forward light signal $E_8$ and a backward light signal $E_9$ in the transfer link from any node of the transfer link (2) by adopting the third optical coupler (25):

$$E_8 \propto \cos[(\omega_0 - \Omega_L + 2\Omega_R)t + \phi_p + \phi_b] + \cos[(\omega_0 + \Omega_L + \Omega_R)t + \phi_b]$$
$$E_9 \propto \cos[(\omega_0 - \Omega_L)t + \phi_a] + \cos[(\omega_0 + \Omega_L)t - \phi_p + \phi_a],$$

wherein $\phi_a$ is phase noise introduced by the transfer link from the local side (1) to an access side (4), and $\phi_b$ is phase noise introduced by the transfer link between the user side (3) to the access side (4); after inputting $E_8$ and $E_9$ to the second photoelectric conversion unit (26) through the fifth optical coupler (31) and performing frequency beat, acquiring $E_{10}$:

$$E_{10} \propto \cos[\Omega_R t + \phi_p] + \cos[\Omega_R t + \phi_b - \phi_a]\cos[(3\Omega_R - 2\Omega_L)t + \phi_b - \phi_a] +$$
$$\cos[2(\Omega_R - \Omega_L)t + \phi_p + \phi_b - \phi_a] +$$
$$\cos[(2\Omega_L - \Omega_R)t - \phi_p]\cos[2\Omega_R t + \phi_p + \phi_b - \phi_a];$$

after narrow-band filtration of a final term of $E_{10}$ and two frequency division of the second frequency divider unit (27), acquiring $E_{11}$ according to a phase relation $\phi_p = \phi_a + \phi_b$:

$$E_{11} \propto \cos[\Omega_R t + \phi_b];$$

after loading $E_{11}$ on the third acousto-optical frequency shifter (28), reversely transferring a signal $E_{12}$:

$$E_{12} \propto \cos[(\omega_0 - \Omega_L + \Omega_R)t + \phi_p] + \cos[(\omega_0 + \Omega_L)t;$$

and filtering a second term of $E_{12}$ in the formula by the second optical filter (29) to acquire a phase-stabilized optical frequency signal $E_{13} = \cos[(\omega 0 + \Omega L)t$ to be output.

* * * * *